United States Patent [19]

Ferrigno

[11] 4,239,675

[45] * Dec. 16, 1980

[54] LOW DENSITY FILLERS AND PIGMENTS

[76] Inventor: Thomas H. Ferrigno, Trenton, N.J. 08618

[21] Appl. No.: 8,901

[22] Filed: Feb. 2, 1979

Related U.S. Application Data

[63] Continuation of Ser. No. 842,436, Oct. 14, 1977, abandoned.

[51] Int. Cl.³ ............................................. C08L 6/20
[52] U.S. Cl. ............................. 260/39 SB; 260/39 R
[58] Field of Search ......................... 260/39 R, 39 SB

[56] References Cited

U.S. PATENT DOCUMENTS

| | | | |
|---|---|---|---|
| 3,586,654 | 6/1971 | Lerman et al. | 106/308 |
| 3,666,506 | 5/1972 | Cowan et al. | 106/41 |
| 3,714,085 | 1/1973 | Berstein | 260/39 P X |
| 3,801,536 | 4/1974 | Guerantin | 260/39 R X |
| 3,839,064 | 10/1974 | Vincent | 106/308 M |
| 3,853,573 | 12/1974 | Ferrigno | 106/288 B |
| 3,853,574 | 12/1974 | Ferrigno | 106/288 B |
| 3,855,172 | 12/1974 | Iler et al. | 260/395 B X |
| 3,856,545 | 12/1974 | Ferrigno | 106/288 B |
| 3,864,140 | 2/1975 | Ferrigno | 106/308 Q |
| 3,899,346 | 8/1975 | Ferrigno | 106/288 |
| 3,928,059 | 12/1975 | Ferrigno | 106/306 |
| 3,953,421 | 4/1976 | Berstein | 260/17.3 |
| 4,058,434 | 11/1977 | Vincent et al. | 428/306 X |
| 4,132,560 | 1/1979 | Marquisee et al. | 106/288 B |

*Primary Examiner*—Melvyn I. Marquis
*Attorney, Agent, or Firm*—John J. Kane; Frederick A. Zoda; Albert Sperry

[57] ABSTRACT

Low density fillers or pigments adapted for use in paints, plastics, caulks and the like are produced by dispersing particulate materials of an average equivalent spherical diameter of 0.1 to 30 micrometers in an aqueous medium containing an acid-polymerizable resin. The dispersions thus produced are formed into spheroids which are heated to polymerize the resin and evaporate water therefrom so that voids are developed within the products. In this way the particles are bonded together and the product is provided with a protective coating of polymerized resin.

The products thus produced are relatively low in density and may embody various particulate materials which would be hydrated or otherwise adversely reacted with water or other constituents of the paint, plastics, or medium in which they are incorporated.

14 Claims, No Drawings

LOW DENSITY FILLERS AND PIGMENTS

The present application is a continuation of U.S. application Ser. No. 842,436 filed Oct. 14, 1977, and now abandoned.

FIELD OF INVENTION

Paints, plastics and many other similar products frequently contain high concentrations of pigments and fillers not only for the purpose of imparting a desired color thereto but also to improve or modify the flow characteristics, opacity, density, cost or various other desired properties. However, many of such pigments and fillers are relatively dense and tend to sediment in liquid compositions on long standing, whereas other fillers tend to react adversely with water or other ingredients in the composition. For example, anhydrous calcium sulfate, (anhydrite) has not heretofore been suitable for use as a filler in latex paints for the reason that it becomes hydrated in the presence of water causing the paint to harden or the solid matter to flocculate into large agglomerated masses.

In applicant's U.S. Pat. Nos. 3,853,573; 3,856,545 and 3,899,346 methods are described whereby pigments are produced by agglomerating silicate particles and an inorganic binder and thereafter sintering the agglomerates to develop voids therein so as to increase the reflective character thereof while reducing the specific gravity of the product.

DETAILED DESCRIPTION OF THE PREFERRED EMBODIMENT

It has now been found that low density, generally spherical shapes adapted for use as a pigment or filler can be produced by combining a particulate material and preferably, an acid-polymerizable resin in a manner to develop voids in the products and at the same time to provide the spheroids with a substantially non-porous continuous surface which prevents any adverse interaction between the particles and water or other constituents of the composition in which the filler or pigment is incorporated. Therefore the products obtained may not only have a specific gravity which is much lower than the combination of solid materials of which they are composed but may embody particles which might otherwise be adversely affected by components of compositions in which they may be used.

Among the inorganic particulate materials which may be used in the practice of the present invention, anhydrous calcium sulfate is generally preferred although other inorganic materials such as calcium sulfate dihydrate, silica, opal, barium sulfate, hydrous and anhydrous alumino silicates including non-swelling montmorillonites, hydrous and anhydrous alumina, enstatite, spinel, spodumene and a wide variety of feldspars may be used. Synthetically derived materials such as titanium dioxide, zirconium dioxide, ceramic colorants and the like as well as graphite and carbon in pigmentary forms and a wide range of inorganic and organic colorants may be used. In some compositions particles of organic material such as walnut or pecan shell flour, cotton flock or the like may constitute up to 30% of the weight of particulate material, as may white and color pigments.

Since the preferred class of resins employed are acid catalyzed, the particulate material used should not preferentially react with acidic agents so as to interfere with the polymerization of the resins.

The particulate material used may vary in average equivalent spherical diameter from about 0.1 micrometers up to 30 micrometers depending upon the average diameters of the products and the effects desired in the compositions in which they are incorporated.

The resinous material employed in forming the generally spherical products is preferably an aminoplast or amino-aldehyde resin in the form of an aqueous sol such as a urea- or a melamine-formaldehyde sol although resorcinol-formaldehyde and furfuryl alcohol modified urea-formaldehyde, furfuryl and furan resins and similar aqueous dispersions of polymer-forming materials may be used. Melamine-formaldehyde resins provide greater chemical resistance, toughness and water resistance with very pale colors and are available as dry powders which can be dispersed in water to yield sols. Phenol-formaldehyde resins have darker colors, require only heat to polymerize but also are acid-catalyzed and have superior chemical resistance. Resorcinol-formaldehyde and furfuryl resins may be used to confer specific properties to the products of the present invention and may be blended with other suitable resins to obtain superior properties.

Most of the urea-formaldehyde sols and other sols of partial polymers known as adhesive resins as used in the present invention are adjusted to obtain a vehicle (resin plus water) sol containing from about 20% to 70% or more solids. Various surfactants, emulsifiers, dispersing agents, protective colloids, cationic and non-ionic polymers and the like may be used to increase the stability or otherwise improve the properties of the dispersions used in producing the products of the present invention. Such agents are generally present in concentrations of 0.001 to 1% of the total dispersion. Polymerization promoters, catalysts, buffering agents, and other additives are also employed as required in the dispersion.

The dispersions employed in the present invention in producing pigment or filler consist of water, particulate material, polymer forming solids and the additives mentioned above. The composition of such dispersions is as follows in parts by weight:

Polymer-forming solids and additives: 15 to 35
Particulate material: 65 to 85
Water: 4 to 140

Urea-formaldehyde resin sols are normally supplied at about 66% solids in water and additives may be added to obtain a uniform dispersion of the particulate matter. A thixotropic suspension of the fluid composition or dispersion is preferably obtained whereby sedimentation or the particulate material is prevented and, when heated to cause polymerization and drying either during or after forming, a gelled layer rapidly forms on the surface to produce a hollow or vesiculated interior. The dispersions thus produced are preferably spray dried or otherwise formed as spheroids in a manner to produce, on drying, generally rounded or spherical shapes having voids therein and a surface having little or no porosity. Thus the products of the present invention are formed into their final shapes and low densities by the simultaneous process of heating and drying to produce thermosetting compositions. The pigments or fillers thus obtained may be further dried or heated to assure complete polymerization of the resin and to remove any occluded or entrapped water. At the same time any residual formaldehyde or other undesired vapors will be removed from the product.

The sizes and densities of the products will depend upon their compositions and methods of production and may be controlled and varied to obtain fillers or pigments having a great variety of properties depending upon the purposes for which they are to be employed. When designed for use in flat wall paints the products may range in average diameter from about 5 micrometers up to about 50 micrometers. For textured paints having non-reflective, rough surfaces the average diameter of the products may be 200 micrometers or larger whereas fillers or pigments for use in caulking compositions or plastics molding compounds may range in size up to 5 millimeters or more.

The products obtained in accordance with the present invention may contain from about 65 to 85% by weight of solid particulate material of which up to 30% may be a white or color pigment or an organic material or mixtures thereof, and from about 15 to 35% by weight of polymer-forming solids consisting of urea-, melamine-, phenol-, resorcinol-formaldehyde and furfuryl and furfuryl urea condensates, of which up to 40% may be polymer modifiers such as cereal proteins, starches, polyether polyols, various aldehydes such as glyoxal and glutaraldehyde, and reactants such as hexamethoxymethyl melamine and the like. Additives such as promoters when required for polymerization, stabilizers, dispersants, emulsifiers, protective colloids, buffers, flocculants, and surfactants generally constitute up to about 1% of the solids and are considered as part of the polymer. Ammonium chloride is the most generally used class of acid promoter although many acidic ammonium salts are suitable such as ammonium sulfamate, ammonium phenoxy acetate and others. Phosphoric acid, beta chloroethyl urea, ethylene sulfite, various amines and metal salts may also be used.

The densities of the products will depend upon their compositions and the method of fabrication and may range from about 30% to 80% of that calculated for the solid materials of which they are formed. Thus a density reduction of from about 20% to 70% is attainable.

In order to illustrate typical methods and products embodying the present invention the following examples are cited.

In a laboratory procedure, fully calcined gypsum or anhydrite having an average equivalent spherical diameter of 1.4 micrometers, and a density of 2.92, was dispersed in an aqueous medium containing a urea-formaldehyde resin sol, using a high shear mixer, and an acidic polymerization promoter was added. The dispersion was deposited in the form of droplets on a Teflon coated metal surface heated to 150° C. which was occasionally shaken to assure uniform exposure of the resulting beads. The beads hardened in less than 1 minute and were heated for an additional 20 minutes whereby they were rendered volatile-free while containing internal voids and cells as well as blisters where they contacted the Teflon coated surface. The remainder of the surfaces of the beads were hard, uniform and non-porous. The beads reached an equilibrium water absorption of 4 to 10% by weight after soaking for 20 minutes in water containing a wetting agent, resulting from the above-mentioned blisters. The beads were then dried to compare the dry weight of the beads with their weight after soaking. The theoretical density of the beads as a mixture of the solids contained therein was compared to their actual density as determined by water displacement.

The composition of typical dispersions used in such tests and the properties of the resulting beads were as follows, the parts being expressed in parts by weight:

| TEST NO. | 89-7 | 91-1 | 91-2 | 91-3 | 91-5 |
|---|---|---|---|---|---|
| Water | 10.7 | 10.7 | 10.7 | 10.7 | 10.7 |
| Anhydrite | 25.0 | 25.0 | 25.0 | 25.0 | 25.0 |
| Resin sol | 6.5 | 6.5 | 6.5 | 6.5 | 6.5 |
| Additives | 1.03 | 0.88 | 0.68 | 1.18 | 1.43 |
| Density of beads | 1.58 | 1.53 | 1.88 | 2.00 | 1.76 |
| Density reduction, % | 38.0 | 40.0 | 26.0 | 22.0 | 31.0 |

The resin sol was a urea-formaldehyde sol containing 66% solids having a polymerized density of 1.53. The additives used were in the form of 10% aqueous solutions of dispersing agents, surfactants and buffers, with suitable acidic polymerization promoters and retardants.

In other tests, wherein beads were produced as described above, the composition of the dispersions used and the properties of the beads obtained were as follows:

| TEST NO. | 108-2 | 111-1 |
|---|---|---|
| Water | 7.70 | 8.20 |
| Anhydrite | 25.00 | 25.00 |
| Resin sol | 9.50 | 9.00 |
| Additives | 0.48 | 0.84 |
| Density of beads | 1.40 | 1.57 |
| Density reduction, % | 43.00 | 37.00 |

The resin sol and anhydrite used in these tests were similar to those used in the tests described above.

In further tests, the dispersions were spray dried in a pilot plant spray drier 5 feet in diameter using a counter-current two fluid nozzle and an atomizing pressure of 40 pounds per square inch with feed rates of 0.5 to 0.8 pounds per minute. The inlet air temperature ranged from 535° F. to 550° F. and the outlet air temperature ranged from 260° F. to 270° F.

The composition of the dispersions used and the properties of the beads obtained in typical spray drying tests are exemplified as follows, the parts being parts by weight:

| TEST NO. | 112-1 | 112-2 |
|---|---|---|
| Water | 26.8 | 11.47 |
| Anhydrite | 75.0 | 29.03 |
| Titanium dioxide, 0.25 micrometers (average diameter) | — | 3.22 |
| Resin sol | 27.0 | 11.67 |
| Additives | 1.38 | 0.53 |
| Density of beads: | | |
| Size over 74 micrometers | 1.55 | 1.63 |
| Size −74+ 44 micrometers | 2.08 | 1.86 |
| Size −below 44 micrometers | — | 2.07 |
| Density reduction, % | 37 to 16 | 36 to 18 |
| Floaters, % by wt. | 3 | 8 |

The beads obtained from the spray-dryer chamber were used in determining the density but were found to have an average volatile content of 1.3% by heating the same to 105° C. for 30 minutes. It is noted that the smaller beads had a higher density due to the high solids content of the dispersions whereas a significant amount of "floaters" were produced indicating densities well below 1 and density reductions in the order of 70%.

The following examples illustrate another method of forming applicant's products. Plastic mixtures were made which could be rolled to spheroidal forms of about 2 to 3 millimeters in average diameter between the thumb and forefinger. These were then placed in the heated Teflon coated pan and shaken to cure uniformly. This method would approximate extrusion and chopping into small pieces and rounding in a tumbling drum with the aid of a now aqueous volatile fluid to prevent sticking and to be removed before or during heating. In the following example, all beads thus formed were cured in the pan for 20 minutes at about 150° C. and tested as before.

The UF (urea-formaldehyde) and MF (melamine-formaldehyde) condensate resins were 50% solids sols and the particulate materials are identified according to their average particle sizes.

| TEST NO. | 41B-5 | 54-1 | 54-3 | 54-4 | 54-6 | 54-7 | 50-3 |
|---|---|---|---|---|---|---|---|
| Water | 2.0 | 0.6 | 0.5 | 0 | 2.6 | 2.6 | 3.0 |
| Feldspar, 4 micrometers | — | — | — | — | 25.0 | — | — |
| Feldspar, 8 micrometers | — | 20.0 | 22.5 | — | — | 25.0 | 20.0 |
| 80% feldspar 20% silica, 24 micrometers | — | — | — | 25.0 | — | — | — |
| Silica, 5 micrometers | 25.0 | — | — | — | — | — | — |
| Titanium dioxide, 0.25 micrometers | — | 5.0 | 2.5 | — | — | — | — |
| Kaoline, 3.5 micrometers | — | — | — | — | — | — | 5.0 |
| UF Sol | 8.14 | 8.14 | 4.07 | 6.8 | 8.14 | — | 8.14 |
| MF Sol | — | — | 4.07 | — | — | 8.14 | — |
| Additives | 0.29 | 0.42 | 0.42 | 0.40 | 0.42 | 0.16 | 0.42 |
| Density of beads | 1.83 | 1.74 | 1.57 | 1.53 | 1.55 | 1.89 | 1.62 |
| Density reduction, % | 21 | 29 | 35 | 36 | 34 | 19 | 31 |

In the following example, the UF sol was 66% solids. The protein sol was a collagen protein solution containing 50% solids. ATH was alumina trihydrate and all particulate materials were identified as before.

| TEST NO. | 64-6 | 66-10 | 67-1 | 67-8 |
|---|---|---|---|---|
| Water | 2.5 | 3.6 | 4.0 | 4.2 |
| Silica, 2 micrometers | — | — | 25.0 | — |
| Feldspar, 5 micrometers | 25.0 | 25.0 | — | — |
| ATH, 7.5 micrometers | — | — | — | 25.0 |
| UF Sol | 5.55 | 6.16 | 6.16 | 5.65 |
| Protein sol | 0.82 | — | — | — |
| Additives | 0.68 | 0.34 | 0.31 | 0.30 |
| Density of beads | 1.57 | 1.58 | 1.75 | 1.61 |
| Density reduction, % | 33 | 33 | 27 | 29 |

In addition to the tests described above many other compositions have been produced and used to form rounded or globular bodies in accordance with the present invention. Thus melamine-formaldehyde and other condensate resins and mixtures thereof have been used and numerous particulate materials such as carbon black, organic pigments and ceramic colorants have been employed. In this way the hardness, density and other properties of the products can be varied and the characteristics of the paint, casting or other composition in which the filler or pigment is incorporated can be modified or controlled.

While particular compositions and procedures of this invention have been described above, it will be readily apparent that many changes may be made in the form and arrangement of the compositions and procedures without varying from the essence of the present invention. In consideration thereof, it should be appreciated that preferred alternatives of the present invention disclosed herein are intended to be illustrative only and not intended to limit the scope of the invention.

I claim:

1. A product adapted for use as a filler and pigment in paints, plastics, and caulking compositions comprising from 65% to 85% by weight of particulate material having an average equivalent spherical diameter from about 0.1 to about 30 micrometers and from about 15% to 35% by weight of aldehyde condensate resin including additives, said product being generally spheroidal and having voids therein, said product having a density which is at least about 20% to 70% less than that of the materials of which the product is composed.

2. A product as defined in claim 1 wherein said particulate material is predominantly calcium sulfate.

3. A product as defined in claim 1 wherein said resin is selected from the group consisting of urea-, melamine-, resorcinol-, phenol-formaldehyde, furfuryl alcohol and furfural-urea condensates and mixtures thereof, and from 0 to about 40% by weight of polymer modifiers.

4. A product as defined in claim 1 wherein said resin is selected from the group consisting of urea-, melamine-formaldehyde condensate and mixtures thereof.

5. A product as defined in claim 1 wherein up to 30% by weight of the particulate material is selected from the group consisting of white and colored pigments and organic material and mixtures thereof.

6. A product as defined in claim 1 wherein said spheroidal forms have an average equivalent spherical diameter between about 5 micrometers and 5 millimeters.

7. A product as defined in claim 1 wherein said particulate material is selected from the group consisting of calcium sulfate, calcium sulfate dihydrate, silica, opal, barium, sulfate, hydrous and anhydrous alumino silicates, non-swelling montmorillonites, hydrous and anhydrous alumina, enstatite, spinel, spodumene, feldspar and mixtures.

8. The product as defined in claim 1 further including a substantially continuous, non-porous surface to prevent any interaction with said particulate material.

9. The method of producing low density spheroids adapted for use as fillers and pigments in paints, plastics, caulking compositions which comprise the steps of forming a dispersion containing from about 65 to 85 parts by weight of particulate material, about 15 to 35 parts by weight of aldehyde condensate polymer forming solids and additives, and from about 4 to 100 parts by weight of water, thereafter producing generally spheroidal forms of said dispersion and subjecting said forms to a temperature and for a time sufficient to polymerize the polymer forming solids, remove water therefrom and develop voids therein.

10. The method as defined in claim 9 wherein said particulate material has an average particle size of from about 0.1 to 30 micrometers and said spheroidal forms have an average size between about 5 micrometers and 5 millimeters.

11. The method as defined in claim 9 wherein said spherical forms are produced by spray-drying.

12. The method as defined in claim 9 wherein said particulate material is predominantly calcium sulfate.

13. A method as defined in claim 9 wherein said particulate material is selected from the group consisting of calcium sulfate, calcium sulfate dihydrate, silica, opal, barium sulfate, hydrous and anhydrous alumino silicates, non-swelling montmorillonites, hydrous and anhydrous alumina, enstatite, spinel, spodumene, feldspar and mixtures thereof, and said polymer forming solids is selected from the group consisting of urea-, melamine-, resorcinol-, phenol-formaldehyde, furfuryl alcohol, furfural-urea condensates, and modifications and mixtures and from 0 to about 40% by weight of polymer modifiers.

14. A method as defined in claim 9 wherein said particulate material includes up to 30% by weight of material selected from the group consisting of white and colored pigments and organic material mixtures thereof.

* * * * *